May 16, 1939.   E. M. SPLAINE   2,158,159
OPHTHALMIC MOUNTING
Filed Oct. 14, 1937
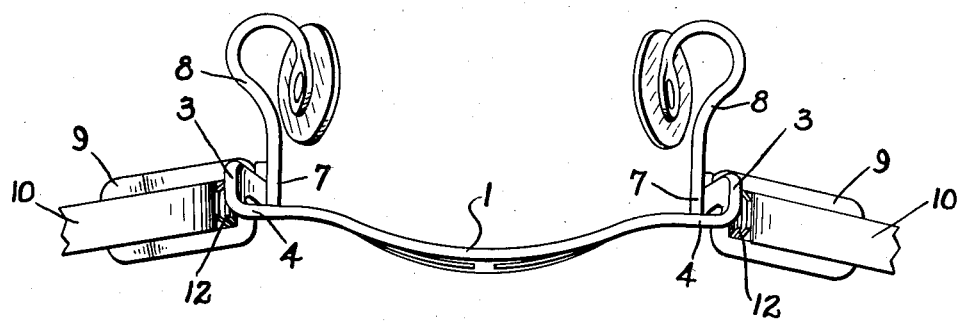
Fig. I
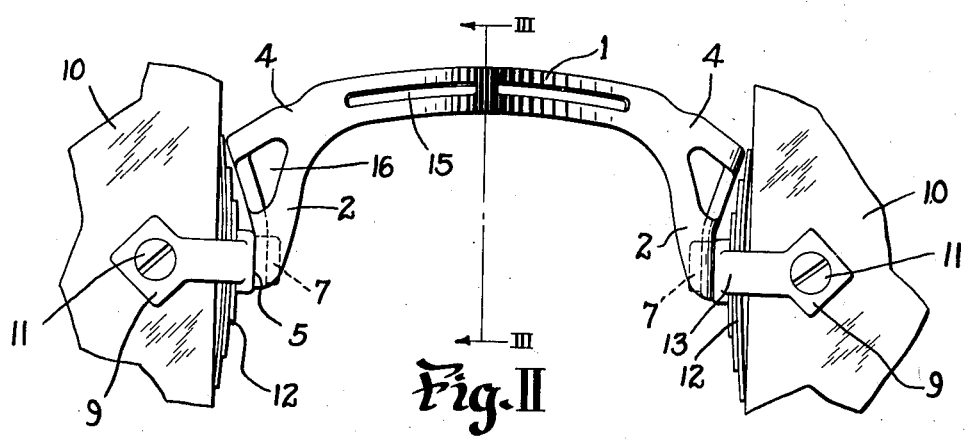
Fig. II
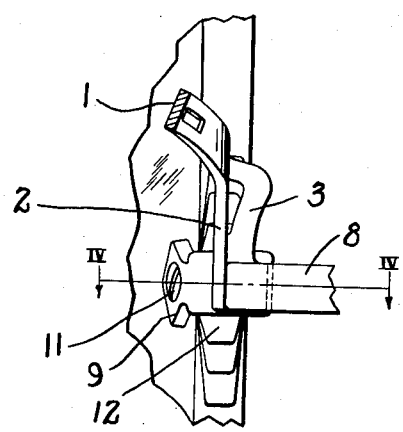
Fig. III
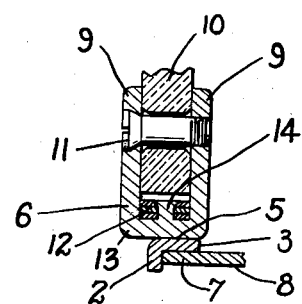
Fig. IV
INVENTOR
EDWARD M. SPLAINE
BY
Harry H. Styll
ATTORNEY Patented May 16, 1939

2,158,159

UNITED STATES PATENT OFFICE 2,158,159

OPHTHALMIC MOUNTING

Edward M. Splaine, Southbridge, Mass., assignor to American Optical Company, Southbridge, Mass., a voluntary association of Massachusetts Application October 14, 1937, Serial No. 168,959

5 Claims. (Cl. 88—43)

This invention relates to improvements in ophthalmic mountings and has particular reference to an improved bridge for connecting the lens holding means of such mountings and method of making the same.

One of the principal objects of the invention is to provide a bridge for connecting the lens holding means of an ophthalmic mounting wherein the supporting portions of the bridge will be greatly reinforced and has particular reference to the method of making the same.

Another object of the invention is to provide a novel construction for a bridge for an ophthalmic mounting whereby the operation of securing the bridge to the lens holding means will not reduce the rigidity of said bridge to such an extent as to effect its utility in properly supporting the lenses before the eyes during the use of the mounting.

Another object is to provide a bridge of the above character having a relatively resilient central arch portion and rigid depending side portions.

Other objects and advantages of the invention should become apparent from the following descriptions taken in connection with the accompanying drawing and it will be apparent that many changes may be made in the details of construction, arrangement of parts, and method shown and described without departing from the spirit of the invention as expressed in the accompanying claims. I, therefore, do not wish to be limited to the exact details shown and described as the preferred form only has been given by way of illustration.

Referring to the drawing:

Fig. I is a plan view of the bridge embodying the invention;

Fig. II is a front elevation of said bridge;

Fig. III is a sectional view taken as in line III—III of Fig. II and looking in the direction indicated by the arrows; and Fig. IV is a sectional view taken on line IV—IV of Fig. III and looking in the direction indicated by the arrows.

Much difficulty has been encountered in providing a bridge for connecting the lens holding means of an ophthalmic mounting which will retain its shape and properly support lenses before the eyes of the wearer during use.

One of the main difficulties was in having the supporting portions of the bridge, namely, the portions connecting the bridge to the lens holding means, become bent and distorted during use with the result that the lenses were not held in proper position before the eyes. This bending and distorting of the bridge members in instances wherein spherical lenses were held by the lens holding means would not involve any serious result other than that it was particularly undesirable from the asthetical standpoint. In instances, however, when cylindrical or prismatic lenses were being held by the lens holding means much difficulty and serious trouble resulted. This was due mostly to the fact that cylindrical or prismatic lenses must be so supported that their axes are retained in proper relation with the eyes. If these axes are displaced due to distortion or bending of the bridge means such lenses will tend to increase the optical defects rather than neutralize and compensate for said optical defects of the eyes.

The above difficulties were greatly amplified by the change in the style trend which introduced high arch bridges, as the depending supporting portions of said bridges were necessarily increased in length and were more susceptible to becoming bent and distorted. Some attempts have been made to increase the material of the depending side supporting portions of such bridges but this introduced manufacturing difficulties and greatly increased the cost of manufacture and the resultant cost of such products to the consumer.

The present invention, therefore, is directed particularly to overcoming the above difficulties by providing a bridge member which may be economically formed from sheet stock by blanking or other mechanical means and whose depending side supporting portions are greatly reinforced by bending said depending portions to produce a change that will be hereinafter described in detail.

Referring more particularly to the drawing wherein like characters of reference designate like parts throughout the several views, the device embodying the invention comprises a central arch portion 1 having depending side supporting portions 2.

The central arch portion 1 and depending portions 2 are in this particular instance preferably formed from sheet material and are formed to the contour shape and dimensions desired by suitable blanking dies or other means. The central arch portion is curved outwardly as indicated in Fig. I and the depending side portions 2 are angled as indicated in Fig. I to provide rearwardly extending angle portions 3. The portions 3 extend substantially at right angles to the main depending portions 2 and ends 4 of the central arch portion and produce a reinforcing angle iron effect which greatly increases the rigidity of said portions 2 and prevents their becoming bent and distorted during use. The lower end of the rearwardly angle portion 3 is preferably secured as illustrated at 5 by soldering or other suitable means to the lens holding means 6. The ends 7 of the nose pad supporting arms 8 are simultaneously or separately secured within the channels of the angled portions 2 and 3 so that the ends 7 lie behind the portions 2 and are substantially invisible when the mounting is viewed from the front. The lens holding means 6 in this particular instance is the usual ophthalmic lens strap having lens face engaging portions each secured to the lens 10 by a screw or other connecting means 11. The screw members in this particular instance function as pivot means for connecting the lens straps to the lenses and the lens straps are provided with a plurality of resilient members 12 secured to the portion 13 of the lens strap overlying the edge of the lens by a rivet or other suitable securing means 14.

The resilient members 12 are adapted to resiliently limit the pivotal movement of the lens 10 on the connecting means 11 during use so as to function as shock and strain absorbing means.

The central arch portion 1 of the bridge embodying the invention may be formed rigid, semipliable or resilient as desired but in all instances it should be of such a nature and should have such characteristics as to tend to retain the shape to which it has been formed or in instances when resilient return to its initial set after it has been bent or released.

The central arch portion, therefore, functions as shock and strain absorbing means when the lenses are moved relatively to each other in a direction normal to the plane thereof and the resilient means 12 function as shock and strain absorbing means when the lenses are moved relative to each other in the direction of their planes. During such movements the depending side supporting portions 2, due to the angle iron construction thereof with the adjacent angle portion 3 prevent bending and distorting of said portions so that the lenses will be retained and positively supported in their proper prescriptive relation with the eyes.

Although applicant has shown and described the lens holding means as being a lens strap it is to be understood that said lens holding means may be in the form of lens supporting rims or the like.

The process of forming the bridge member in this particular instance involves the steps of blanking the main bridge member from sheet material, striking the central arch portion 1 to curve the said portion outwardly as shown in Fig. I and thereafter bending said portions 3 rearwardly to substantially normal relation with the portions 2 to effectively increase the rigidity of said portions.

If desired the said bridge member may be struck to form openings 15 and 16 therein as illustrated in Fig. II for the purpose of design after the main bridge member has been blanked to the desired contour shape from sheet material and prior to the bending of the depending portions 2.

Due to the fact that in soldering or otherwise securing the portions 3 to the lens holding means 6 the adjacent portions 2 do not have to be heated to soldering or welding temperature, and that the rigidity of the said portions will not be affected by said heat, a much more rigid and durable construction is obtained. Even in instances wherein the adjacent portions 2 are heated the angled relation of the portions 2 and 3 will provide sufficient rigidity to overcome any tendency of the bridge member to become bent or distorted during use.

From the foregoing description it will be seen that simple, efficient and economical means and method has been provided for obtaining a rigid and durable bridge construction for an ophthalmic mounting.

Having described my invention I claim:

1. An ophthalmic mounting comprising a pair of lens holding members connected by a bridge member, said bridge member having a central arch portion and depending side portions secured adjacent their lower ends to said lens holding members, said depending side portions having a front face lying in a plane substantially parallel with the plane of the front face of the central arch portion and having integrally angled edge portions extending rearwardly of said main depending portions at substantially a right angle and extending substantially throughout the length thereof, and nose pad supporting means secured to said rearwardly extending angled portions and adjacent the point of attachment of the bridge member to the lens holding members with the ends of said nose pad supporting means lying within the angle and in the rear of the front face of said depending side portions.

2. An ophthalmic mounting comprising a pair of lens holding members connected by a bridge member, said bridge member having a central arch portion and depending side portions secured adjacent their lower ends to said lens holding members, said central arch portion having a front face lying in a plane substantially parallel with the plane of the lenses when the said lens holding members are in associated relation with the lenses and having its ends folded with a single bend in a sidewise direction to provide integrally angled side portions each lying in a plane substantially at right angles relative to the front face of said central arch portion and with an edge surface disposed substantially parallel with the plane of the front face of said central arch portion with the greater part of the angled bend located above the point of attachment of said depending portion with said lens holding members, each of said depending portions being located in spaced relation with the adjacent edge surfaces of the lenses when in desired associated relation therewith and having a side surface lying in a plane substantially normal to the front face of said central arch portion and of a width substantially greater than the width of said edge surface, and nose pad supporting means secured adjacent the point of attachment of said bridge member to said lens holding members with said nose pad supporting members extending in a direction rearwardly of said depending side portions.

3. An ophthalmic mounting comprising a pair of lens holding members joined by a bridge member, said bridge member comprising a central arch portion having a relatively wide face as compared with its thickness, lying in a plane substantially parallel with the plane of the lenses when associated therewith, and having bifurcated end portion folded with a single bend in a sidewise direction and joined with depending side portions which are angularly disposed relative to said central arch portion so as to lie in a plane substantially normal to the plane of the lenses when in associated relation therewith and being secured to the lens holding members adjacent their lower ends, the greater part of the angled bends being located above the points at which the depending side portions are secured to the lens holding members said depending angularly disposed side portions being in spaced relation with the adjacent edges of the lenses when the said lens holding members are secured to said lenses to facilitate sidewise adjustment, and nose pad supporting arms associated with said lens holding members and bridge members and extending rearwardly thereof from adjacent the point of connection of said depending portions with said lens holding members.

4. An ophthalmic mounting comprising a pair of lens holding members joined by a bridge member, said bridge member having a central portion terminating in bifurcated ends folded with a single bend in a sidewise direction and integrally joined with relatively long depending side portions, said side portions being angularly disposed in substantially normal relation with the front face of said central portion thru bends lying intermediate the ends of the branches of said bifurcated portions, said depending portions being secured adjacent the lower ends thereof to said lens holding members and being adapted to lie in spaced relation with the adjacent edge of the lenses when the said lens holding members are in secured relation with said lenses, the greater portion of said bends lying above the location at which the depending portions are secured to the lens holding members and nose pad supporting arms extending rearwardly of said lens holding members and bridge member from adjacent the point of connection of said depending portions with said lens holding members.

5. An ophthalmic mounting according to claim 2, having lenses held in spaced relation with the depending side portions of the bridge by the lens holding members.

EDWARD M. SPLAINE.